W. H. HOGGARD.
Fertilizer Distributers.

No. 154,795.    Patented Sept. 8, 1874.

WITNESSES
Robert Everitt,
Geo. E. Upham.

INVENTOR
William H. Hoggard
BY Chipman Hosmer & Co
ATTORNEYS

UNITED STATES PATENT OFFICE.

WILLIAM H. HOGGARD, OF CAMILLA, GEORGIA.

IMPROVEMENT IN FERTILIZER-DISTRIBUTERS.

Specification forming part of Letters Patent No. 154,795, dated September 8, 1874; application filed June 20, 1874.

*To all whom it may concern:*

Be it known that I, WILLIAM H. HOGGARD, of Camilla, in the county of Mitchell and State of Georgia, have invented a new and valuable Improvement in Fertilizer and Manure Distributer; and I do hereby declare that the following is a full, clear, and exact description of the construction and operation of the same, reference being had to the annexed drawings making a part of this specification, and to the letters and figures of reference marked thereon.

Figure 1:
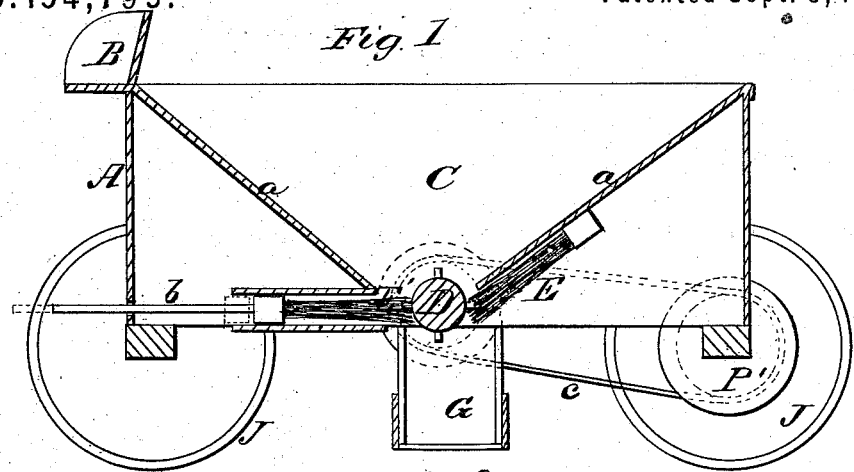
Figure 2:
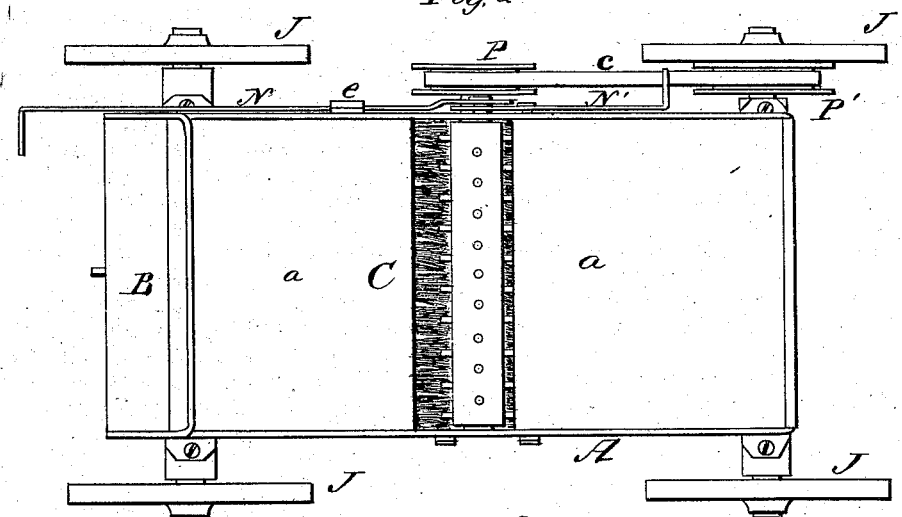
Figure 3:
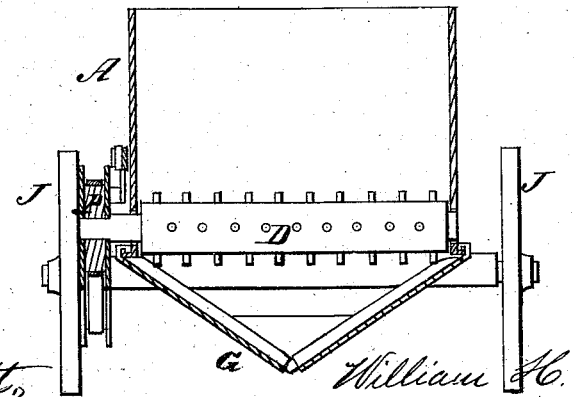

Figure 1 of the drawing is a representation of a longitudinal sectional view of my fertilizer-distributer. Fig. 2 is a plan view of the same. Fig. 3 is a transverse sectional view of the same.

This invention has relation to machines which are designed for distributing fertilizers broadcast or in drills; and it consists in a wagon-body having a double-inclined bottom, combined with a discharging and pulverizing roller, and with brushes, one of which latter is adjustable for regulating the discharge, as will be hereinafter explained.

In the annexed drawings, A designates a wagon-body, which is provided with a seat, B, and mounted on wheels J. This body has two inclined bottoms, $a$ $a$, which form a hopper, C, to receive the fertilizer. At the throat, which is formed between the lower ends of the inclined bottoms $a$ $a$, is a roller, D, which is thickly studded, and which has its bearings in the vertical sides of the wagon-body. On one end of this roller is a flanged pulley, P, around which a belt, $c$, passes, which also passes around another flanged pulley, P', on one of the transporting-wheels J. Above this belt $c$, and pivoted to the wagon-body A, is a belt-tightener, N', to the front end of which a lever or treadle, N, is pivoted, which passes through a fulcrum-staple, $e$, and extends forward to within reach of the driver when sitting in his seat, B. By pressing upon the front end of the lever N the rear end of the tightener N', on which there will be an anti-friction roller, will be pressed upon the belt $c$, and thereby tighten the same on its pulleys. When the tightener is released from the belt the latter will run loose and the roller D will not be turned. E E' designate two brushes, one of which is fixed permanently to one of the inclined bottoms $a$, so as to act on the roller D its entire length. The other brush, E', is adjustable up to and from the roller D by means of a rod, $b$, which passes through the front of the wagon-body. The brushes cause an even distribution of the fertilizer, and by means of the brush E' the discharge of the fertilizer can be regulated. G designates a double-inclined chute, which, when it is desired to sow in drills, is applied beneath the roller D. For broadcast sowing the chute G is removed.

What I claim as new, and desire to secure by Letters Patent, is—

1. The combination of the roller D, the fixed brush E, and the adjustable brush E' with the inclined bottoms $a$ of the wagon-body A, as and for the purpose described.

2. The removable drill-chute G, combined with the discharging-roller D and its brushes E E', as specified.

In testimony that I claim the above I have hereunto subscribed my name in the presence of two witnesses.

WILLIAM H. HOGGARD.

Witnesses:
WM. F. JENKINS,
LAFAYETTE GAUNTT.